United States Patent [19]
Segawa et al.

[11] Patent Number: 5,973,798
[45] Date of Patent: Oct. 26, 1999

[54] IMAGE SCANNER

[75] Inventors: Satoshi Segawa; Atsushi Kashitani, both of Tokyo, Japan

[73] Assignee: NEC Corporation, Japan

[21] Appl. No.: 09/007,955

[22] Filed: Jan. 16, 1998

[30] Foreign Application Priority Data

Jan. 17, 1997 [JP] Japan ................................ 9-019812

[51] Int. Cl.⁶ .............................. H04N 1/04; H04N 1/36
[52] U.S. Cl. ...................... 358/497; 358/494; 358/482; 358/412; 250/236; 250/231.13; 250/237 G
[58] Field of Search ....................... 358/494, 474, 358/497, 483, 482, 475, 471, 401, 400, 412, 406, 410, 505, 504; 250/236, 231.13, 237 G; 382/312; 359/871, 872, 877; H04N 1/36, 1/04

[56] References Cited

U.S. PATENT DOCUMENTS

| | | | |
|---|---|---|---|
| 5,610,730 | 3/1997 | Osipchuk ............................... | 358/494 |
| 5,625,183 | 4/1997 | Kashitani et al. ...................... | 250/236 |
| 5,757,518 | 5/1998 | Kashitani ............................... | 358/474 |
| 5,818,612 | 10/1998 | Segawa et al. ........................ | 358/494 |
| 5,841,553 | 11/1998 | Neukermans .......................... | 358/494 |

FOREIGN PATENT DOCUMENTS

| | | |
|---|---|---|
| 60-128775 | 7/1985 | Japan . |
| 62-151268 | 9/1987 | Japan . |
| 1-265663 | 10/1989 | Japan . |
| 8-7073 | 1/1996 | Japan . |
| 8-154153 | 6/1996 | Japan . |

*Primary Examiner*—Edward L. Coles
*Assistant Examiner*—Cheukfan Lee
*Attorney, Agent, or Firm*—Ostrolenk, Faber, Gerb & Soffen, LLP

[57] ABSTRACT

An image scanner of the present invention includes an angle sensor for controlling subscanning and implemented by a position sensitive light detector (PSD). The angle sensor allows a subscanning mirror to be rotated at high speed without any vibration. A slit plate for causing a restricted part of light issuing from a light emitting element to be incident to the PSD is so configured as to cover the light emitting element, thereby reducing the size of the image scanner.

6 Claims, 9 Drawing Sheets

IMAGE SCANNER

BACKGROUND OF THE INVENTION

The present invention relates to an image scanner for transforming a text image or a graphic image to corresponding digital data and, more particularly, to an image scanner for reading partial images with a linear image sensor and combining them by subscanning to thereby output a complete bidimensional image.

A camera type image scanner having a reading unit including a liner image sensor and a subscanning mechanism is conventional. This type of image sensor reads a document while being spaced from the document. An image scanner DS-3000 available from Chinon Industries Inc. is one of such image scanners. Specifically, the image scanner includes a subscanning mirror rotated by the combination of a stepping motor and a decelerator, thereby sequentially varying the image to be projected onto the linear image sensor. The prerequisite with this type of image scanner is that the stepping rate of the stepping motor be increased with a decrease in required reading time. However, it is difficult to drive stepping motors in general at speeds higher than 1,000 ppm (pulses per minute). Further, vibration ascribable to the operation of the stepping motor has adverse influence on the mirror and other constituents of the image scanner, introducing irregularity in the resulting image. Moreover, gears of utmost accuracy are essential because the image is expanded or contracted unless the decelerator is free from eccentricity.

Japanese Patent Laid-Open Publication No. 1-265663, for example, teaches an image inputing device including a scanning section capable of controlling the rotation angle of a movable mirror. The image inputing device is capable of reducing the irregularity of the output of a photoelectric transducer to a negligible degree. Specifically, the mirror reflects light incident thereto from a subject. A focusing unit focuses the resulting reflection from the mirror onto an image pick-up surface where photoelectric transduction elements are arranged in an array. The transduction elements convert the incident light to an electric signal by main scanning. Every time main scanning completes once, the mirror is angularly moved in the subscanning direction such that the next part of the image is incident to the transduction elements. The problem with the image inputing device is that it lacks means for sensing the rotation angle of the mirror and therefore needs a stepping motor and a deceleration mechanism for controlling the movement of the mirror. This also lowers image quality in the event of high-speed reeding.

Japanese Patent Laid-Open Publication No. 8-7073 also proposes an image scanner of the type controlling the rotation angle of the subscanning mirror by sensing it. The image scanner taught in this document is feasible for high-speed drive. However, this image scanner needs an optical pickup, or sensor, consisting of a number of parts including a laser, light-sensitive element, objective lens, half-mirror, and VCM (Voice Coil Motor) for lens focusing. This makes it difficult to miniaturize the optical pick-up and therefore the entire reading unit. Further, two feedback control lines, one for lens focusing and the other for the rotation of the mirror, are required, rendering circuitry and adjustment sophisticated. Moreover, high-speed operation would cause the mechanical portions to vibrate and would thereby lower image quality. In addition, such an image scanner needs a great number of parts which would increase the cost.

Technologies relating to the present invention are also disclosed in, e.g., Japanese Patent Laid-Open Publication No. 60-128775, Japanese Utility Model Laid-Open Publication No. 62-151268, and Japanese Patent Laid-Open Publication No. 8-154153.

SUMMARY OF THE INVENTION

It is therefore an object of the present invention to provide an image scanner of the type reading a document image bidimensionally with a monodimensional image sensor and a subscanning mechanism including a rotatable mirror, and capable of miniaturizing the subscanning mechanism on the basis of feedback control, but without sacrificing the reading speed or the resolution.

In accordance with the present invention, an image scanner includes a linear image sensor for transforming a document image to an electric signal. A lens focuses the document image on the linear image sensor. A subscanning mirror is rotatable to vary its direction of reflection for thereby sequentially inputing consecutive parts of the document image in a desired direction to the linear image sensor. An actuator causes the subscanning mirror to rotate. An angle sensor senses the rotation angle of the subscanning mirror. A subscan drive controller controls the rotation for subscanning in response to the output of the angle sensor. The angle sensor has a slit plate formed with at least one slit for passing light therethrough and movable in interlocked relation to the rotation of the subscanning mirror, a light emitting element, and a PSD having a plurality of cathodes and facing the light emitting element with the intermediary of the slit plate.

Also, in accordance with the present invention, in an image scanner having a monodimensional image sensor and a subscanning mechanism including a rotatable mirror for reading a document image bidimensionally, an angle sensor responsive to the rotation angle of the mirror for controlling subscanning has a slit plate formed with a slit, a light emitting element, and a PSD having a plurality of cathodes and facing the light emitting element with the intermediary of the slit plate. The slit plate for causing a restricted part of light to be incident to the PSD is so configured as to intercept light issuing from the light emitting element or to cover the light emitting element. The angle sensor senses the rotation angle by causing a position on the light-sensitive surface of the PSD where the light from the light emitting element is incident via the slit to vary in accordance with the rotation of the mirror.

BRIEF DESCRIPTION OF THE DRAWING

The above and other objects, features and advantages of the present invention will become apparent from the following detailed description taken with the accompanying drawings in which.

Figure 1:
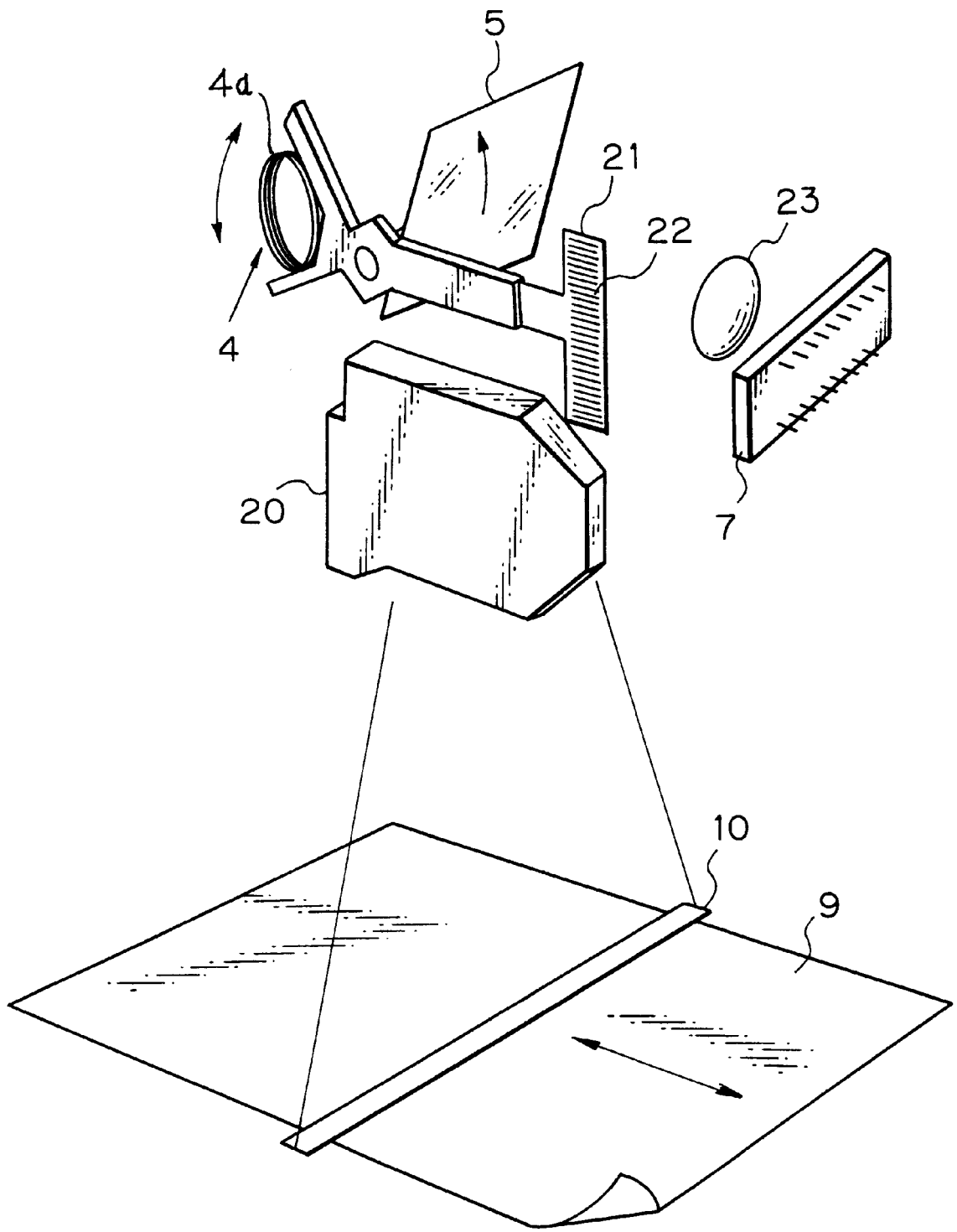
FIG. 1 is a perspective view showing a conventional image scanner.

In the drawings, identical references denote identical structural elements.

DESCRIPTION OF THE PREFERRED EMBODIMENTS

To better understand the present invention, brief reference will be made to a conventional image scanner, shown in FIG. 1. The image scanner to be described is taught in Japanese Patent Laid-Open Publication No 8-7073 mentioned earlier. As shown, the image scanner includes a rotatable subscanning mirror 5 and a magnetooptical disk position gauge 21 rotatable in interlocked relation to the mirror 5. The position gauge 21 is formed with track grooves 22. The position gauge 21 is affixed to an arm extending from the center of rotation of the mirror 5 perpendicularly to the direction of rotation of the position gauge 21. An optical pickup 20 is mounted on a casing, not shown, and focused on the track grooves 22 of the position gauge 21.

While the mirror 5 is rotated, describing an arc, the position gauge 21 is rotated in the same manner as the mirror 5. An objective lens, not shown, built in the pickup 20 has an optical axis extending substantially perpendicularly to the track grooves 22 of the position gauge 21. In this condition, every time the track of the position gauge 21 crosses the objective lens of the pickup 20, the pickup 20 generates a track error signal. The pickup 20 therefore plays the role of a sensor responsive to the angular position of the mirror 5. There are also shown in FIG. 1 an actuator 4, a linear image sensor 7, a document 9, a subscanning position 10, and a lens 23 for focusing an image.

The image scanner with the above configuration has some problems left unsolved, as discussed earlier.

Preferred embodiments of the image scanner in accordance with the present invention will be described hereinafter.

1st Embodiment

Figure 2:
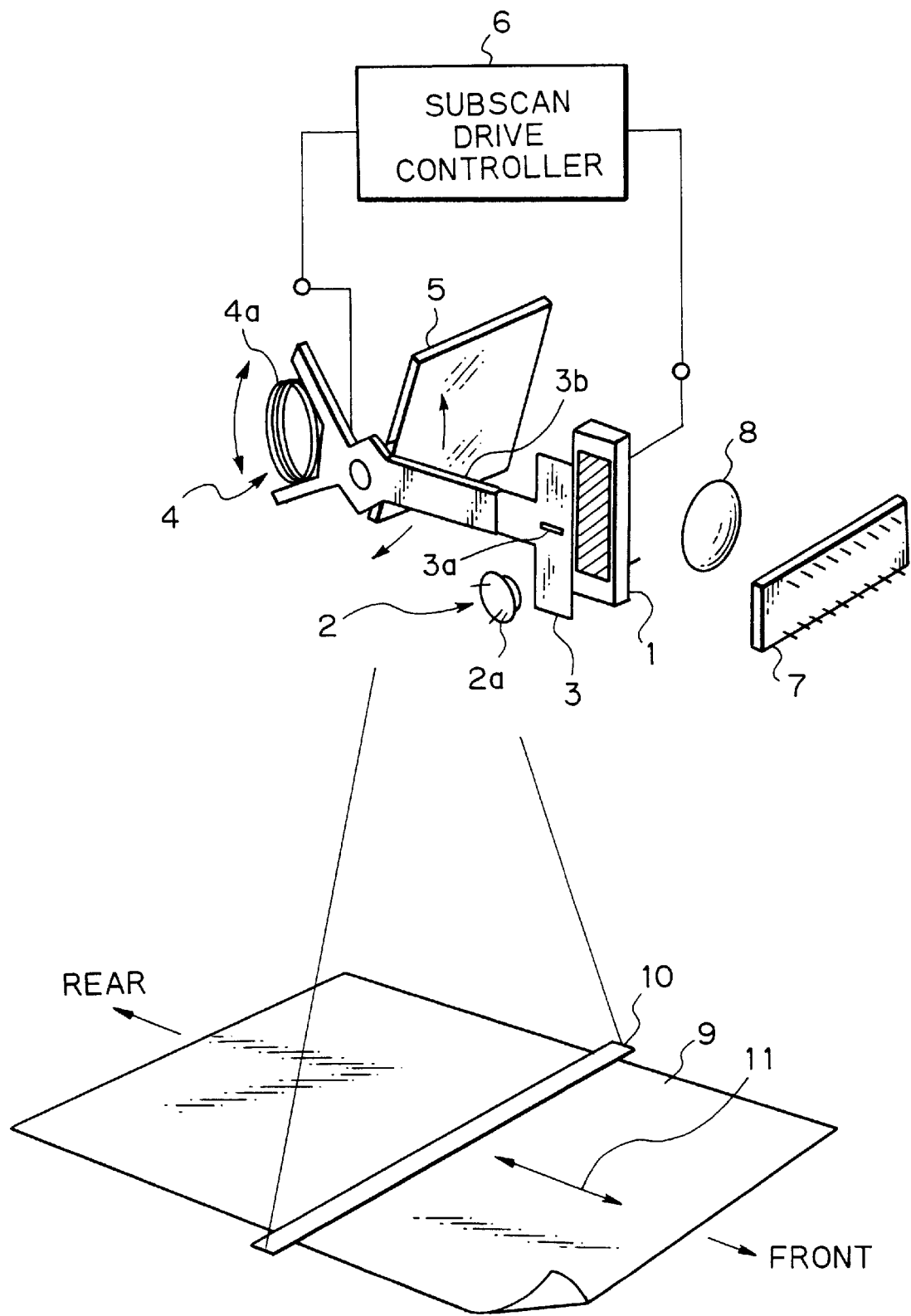
FIG. 2 is an exploded perspective view showing a first embodiment of the image scanner in accordance with the present invention.

Referring to FIG. 2, an image scanner embodying the present invention includes a linear image sensor 7 generally referred to as a line CCD (Charge Coupled Device) image sensor. The image sensor 7 transforms a difference in the luminance of an image to an electric signal. A lens 8 focuses an image read out of a document 9 on the light-sensitive surface of the image sensor 7. A subscanning mirror 5 is rotatable to vary its direction of reflection. The mirror 5 in rotation causes parts of a document image in the desired direction to be sequentially input to the image sensor 7. An actuator 4 causes the mirror 5 to rotate for the above purpose. The rotation angle or angular position of the mirror 5 is sensed by an angle sensor. The angle sensor is made up of a slit plate 3, a light emitting element 2 implemented by an LED (Light Emitting Diode) 2a, and a PSD or semiconductor position sensor 1 having a plurality of cathodes. The slit plate 3 is formed with at least one slit 3a and movable in unison with the rotation of the mirror 5. The slit plate 3 is positioned between the light emitting element 2 and the PSD 1. A subscan drive controller 6 controls, in response to the output of the PSD 1, the rotation for subscanning on a feedback basis. There are also shown in FIG. 2 an arm 3b supporting the slit plate 3, a subscanning position 10, and a subscanning direction 11.

The linear image sensor 7 may be implemented by μPD3734 (trade name) available from NEC Corp. and having 2,660 pixels and an image transfer rate of higher than 4 MHz. The focusing lens 8 may be formed of glass and provided with an f number of 5.5 and a focal distance of 50 mm. In the illustrative embodiment, the mirror 5 is implemented as a flat mirror having a 4 cm×3 cm reflecting surface by way of example. For the actuator 4, use may be made of a VCM 4a having a diameter of 2 cm.

The PSD 1 which is one of characteristic features of the illustrative embodiment belongs to a family of photodiodes. Typically, the PSD 1 is made up of a cover provided with an output terminal, and a semiconductor provided with a window member on its top for transmitting light. A PN junction is formed in the space delimited by the cover and window member in order to transform incident light to an electric signal. Let the surface of the semiconductor having the window member be referred to as a light-sensitive surface. When light in the form of a spot is incident to the light-sensitive surface, the charge distribution of the light-sensitive surface becomes uneven within the spot. As a result, charge flows to the portion outside of the spot, generating current. For example, a PSD semiconductor S3932 (trade name) available from Hamamatsu Photonics has high resistance and outputs current inversely proportional to the distance to an output electrode.

The PSD must have its PN junction to be operated in a reverse bias state, so that a higher potential is applied to an N layer than to a P layer. Therefore, the PSD is provided with an input terminal on its cathode side. The PSD is different from a line image sensor in that it is capable of outputting a continuous electric signal in accordance with the position of the spot on the light-sensitive surface.

Figure 3:
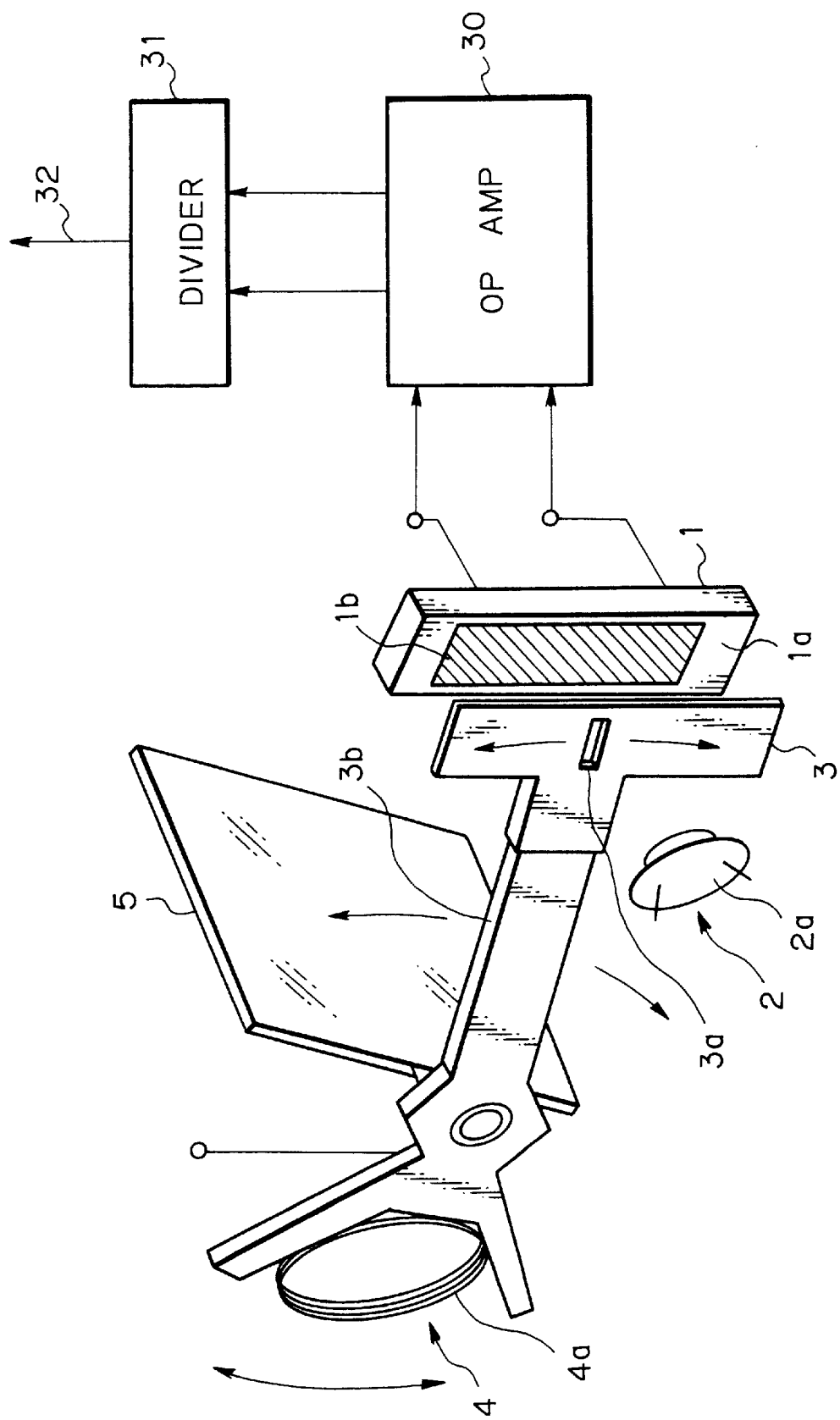
FIG. 3 shows an essential part of the first embodiment specifically.

FIG. 3 shows the angular position sensing section of FIG. 2 together with a part of the subscan drive controller 6 responsive to the output of the PSD 1. As shown, the PSD 1 has a light-sensitive surface 1a including an effective light-sensitive area 1b. The slit plate 3 rotatable integrally with the mirror 5 is located in front of the light-sensitive surface 1a. In the illustrative embodiment, the slit plate 3 is implemented by a 0.5 mm thick, 6 mm wide and 40 mm long aluminum plate. The slit 3a formed in the slit plate 3 is 4 mm long and 0.5 mm wide. The arm 3b extending from the center of rotation of the mirror 5 to the slit plate 3 is dimensioned such that the slit 3a moves in front of the light-sensitive surface 1a in accordance with the rotation of the mirror 5. Further, in this embodiment, the LED 2a emits infrared rays so as to cause restricted light to reach the PSD 1 via the slit 3a.

Two currents output from the PSD 1 are directly input to an operational amplifier (OP AMP) 30 and subjected to voltage conversion thereby. For the OP AMP 30, use may be made of μPD 258 (trade name) available from NEC Corp. The resulting two outputs of the OP AMP 30 are input to a divider 31. As a result, the divider 31 outputs an electric position signal 32 proportional to the position of the slit 3a without being influenced by the quantity of incident light.

Referring again to FIG. 2, assume that the slit 3a adjoins the lower portion of the PSD 1 when the mirror 5 scans the rear side of the document 9 or adjoins the upper portion of the same when the mirror 5 scans the front side of the document 9. Also, assume that the polarities of the PSD 1 are connected such that the potential is low when the slit 3a adjoins the lower portion of the PSD 1 or high when it adjoins the upper portion of the PSD 1. Then, when the mirror 5 scans the document 9 from the front toward the rear in the subscanning direction, the potential of the position signal 32 (FIG. 3) output from the divider 31 is low at first, but sequentially increases in accordance with the rotation of the mirror 5. In this manner, the angular position of the mirror 5 can be detected in terms of the output potential of the divider 31.

Figure 4:
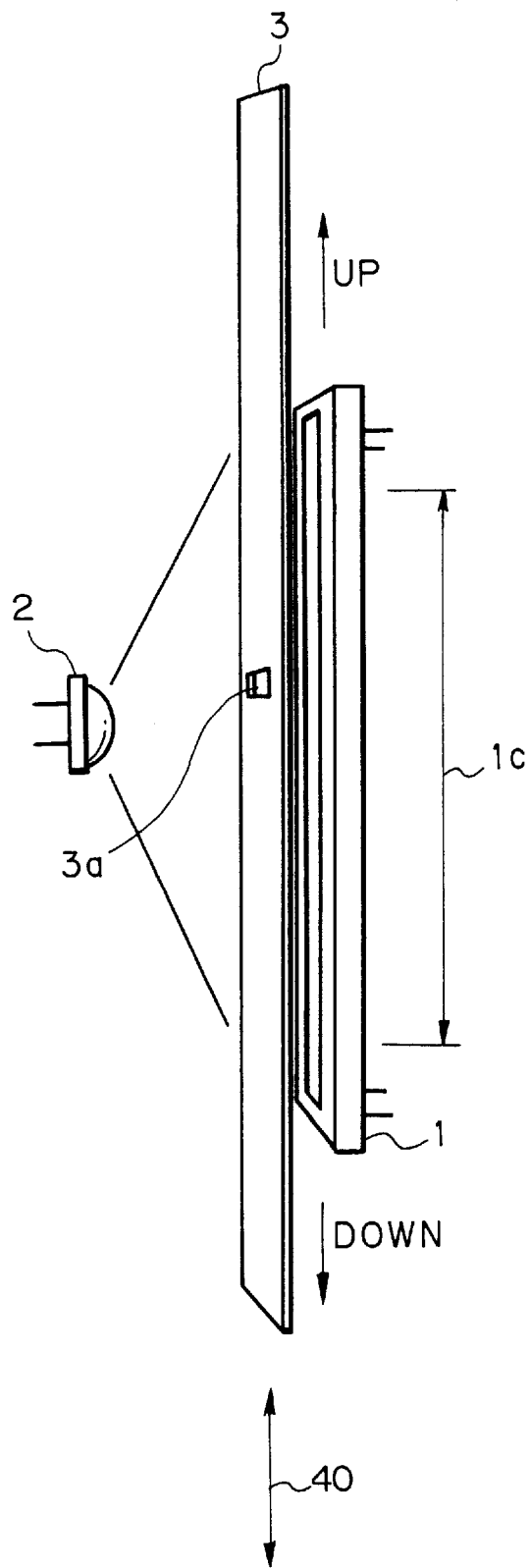
FIG. 4 shows a relation between a slit plate and a position sensitive light detector (PSD) included in the first embodiment.

The effective light-sensitive area 1b of the PSD 1 should preferably be used as broadly as possible in matching relation to the rotation angle necessary for subscanning for the following reason. While resolution for angle detection is effected by the resolution of the PSD 1, resolution available with the PSD 1 for a unit light-sensitive length is limited. Therefore, as shown in FIG. 4, if light moves in a direction 40 in accordance with the rotation for subscanning over the greatest possible range not exceeding the length 1c of the effective light-sensitive area 1b, then the resolution of the PSD 1 can be effectively used.

When the slit plate 3 is flat, when the slit 3a adjoins the PSD 1, and when the slit 3a moves over the entire length 1c of the effective light-sensitive area 1b, the slit plate 3 must be about twice as long as the effective light-sensitive length 1c.

2nd Embodiment

Reference will be made to FIGS. 5 and 6A–6C for describing a second embodiment of the present invention. As shown, this embodiment is characterized in that a slit plate 3c movable in front of the light-sensitive surface 1a of the PSD 1 is not flat, but it is so bent as to cover the light emitting element 2 opposite in position to the PSD 1. While the light emitting element 2 for issuing light toward the PSD 1 is implemented by the infrared LED 2a, the LED 2a is a spot slight source and causes the light to diffuse radially. On the other hand, it is necessary for the light issuing from the LED 2a to be incident only to the portion of the light-sensitive surface 1a of the PSD 1 corresponding to the angular position of the mirror 5 via a slit 3d formed in the slit plate 3c. Stated another way, the portion of the light-sensitive surface 1a other than the above portion must be masked from the light issuing from the LED 2a. To meet this requisite, considering the fact that the light from the LED 2a is diffused radially, the slit plate 3c is so bent as to mask the portion other than the slit 3d at a position as close to the LED 2a as possible.

Figure 6A:
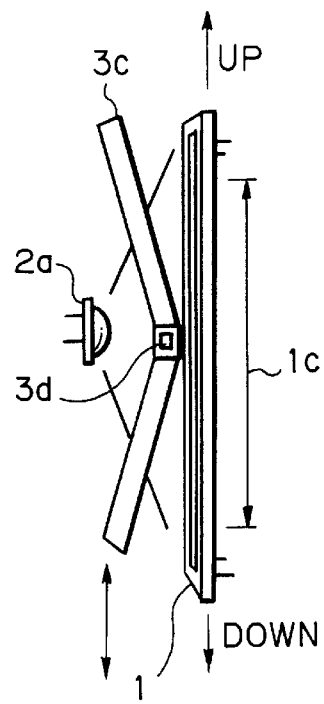
FIGS. 6A–6C show a relation between a slit plate and a PSD included in the second embodiment.
Figure 6B:
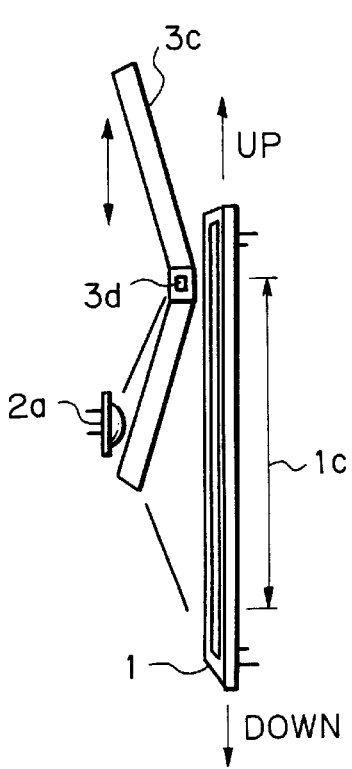
Figure 6C:
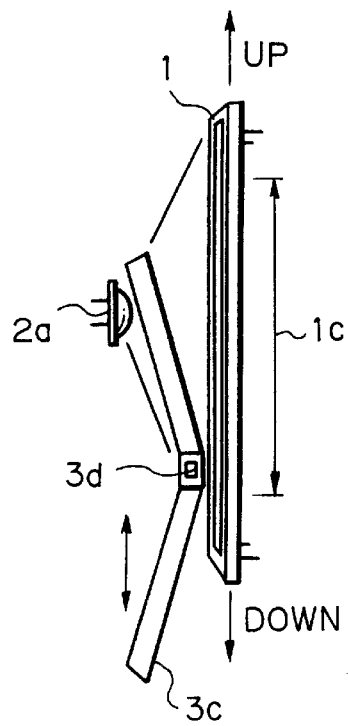

The relation between the slit plate 3c, LED 2a and PSD 1 particular to this embodiment is as follows. As shown in FIG. 6B, when the slit 3d of the slit plate 3c faces the upper portion of the light-sensitive surface 1a of the PSD 2, the end of the plate 3c below the slit 3d should only be located below an imaginary line connecting the LED 2a and the lower end of the effective light-sensitive area 1b. Likewise, as shown in FIG. 6C, when the slit 3d faces the lower portion of the light-sensitive surface 1a, the end of the plate 3c above the slit 3d should only be located above an imaginary line connecting the LED 2a and the upper end of the effective light-sensitive area 1b.

Consequently, the length of the slit plate 3c can be reduced more as the ends of the plate 3c are brought closer to the LED 2a. Specifically, when the slit 3d is small and when the LED 2a is an ideal spot light source, the length of the slit plate 3c in the direction parallel to the PSD 1 can be as small as the length of the effective light-sensitive area 1b of the PSD 1. More specifically, a flat slit plate would have a length about three times as great as the length of the light-sensitive surface of the PSD, taking account of the movement of the plate interlocked to the rotation of the mirror 5. By contrast, the slit plate 3c bent in one direction is only about twice longer than the light-sensitive surface 1a of the PSD 1.

Figure 5:
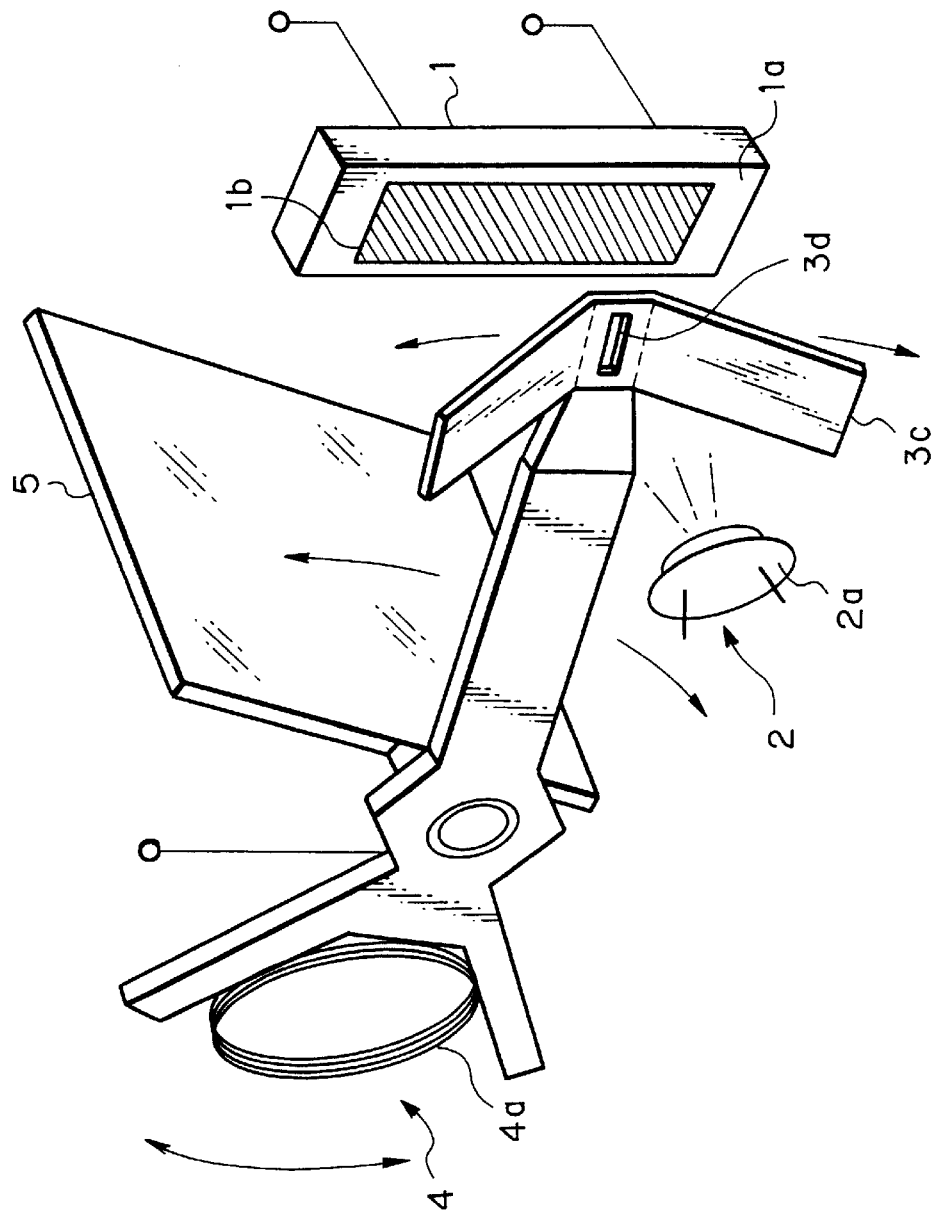
FIG. 5 is a perspective view showing a second embodiment of the present invention.

In FIG. 5, the slit plate 3c is shown as having two flaps bent toward the LED 2a away from the slit 3d. Alternatively, the slit plate 3c may be provided with a parabolic or similar concave structure so long as it is capable of screening the light issuing from the LED 2a effectively.

3rd Embodiment

Figure 7:
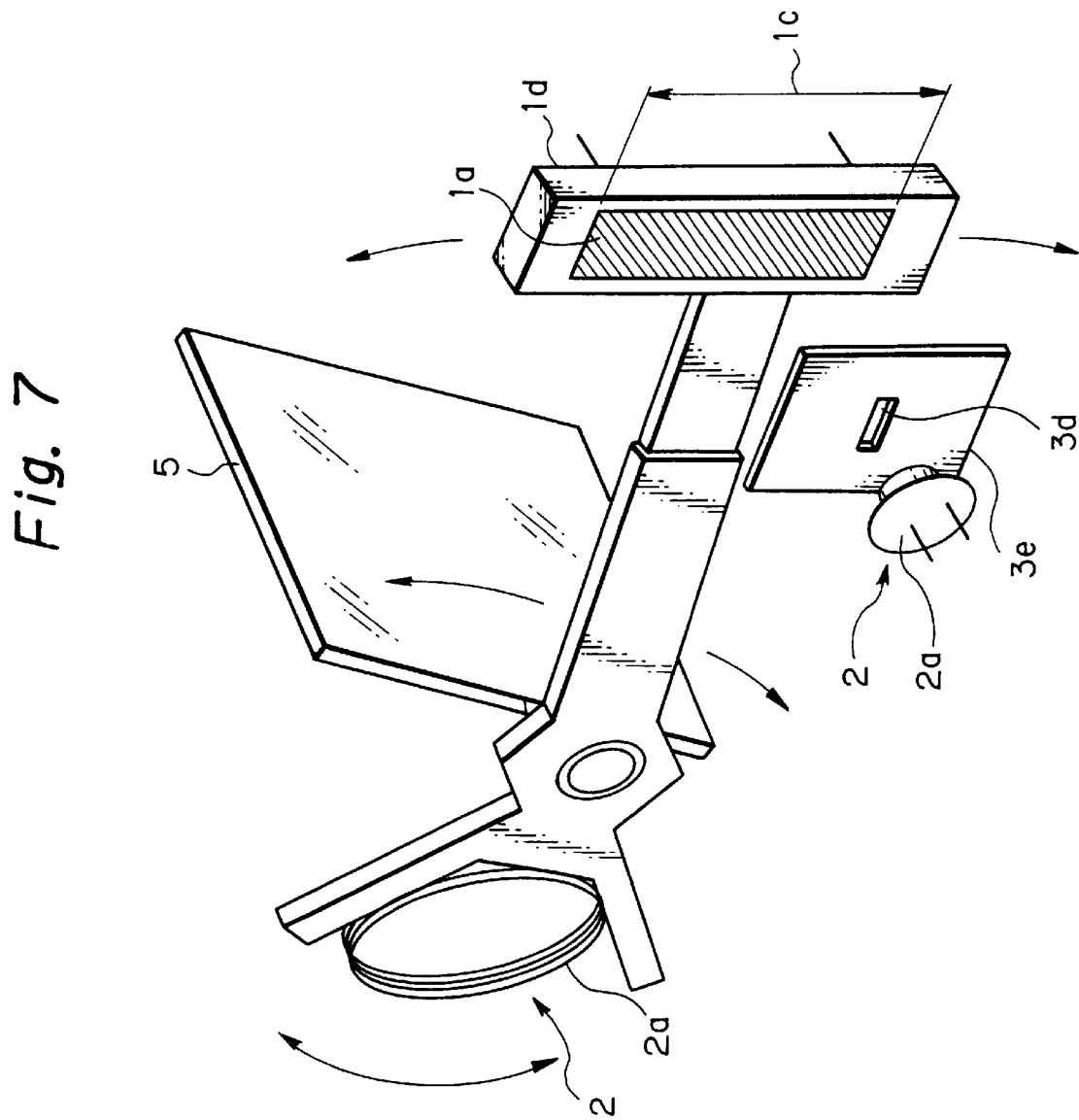
FIG. 7 is a perspective view showing a third embodiment of the present invention.

FIG. 7 shows a third embodiment of the present invention. As shown, the light emitting element 2 and a PSD 1d are positioned at at both sides of a slit plate 3e. The PSD 1d is movable in front of the slit plate 3e in interlocked relation to the mirror 5 while the light emitting element 2 and plate 3e are fixed in place. In this configuration, when the mirror 5 is rotated for subscanning, the PSD 1d moves with its light-sensitive surface 1a facing the slit 3d. The maximum length over which the PSD 1d is movable is selected to be smaller than the effective light-sensitive length 1c.

Because only the PSD 1d is movable, the positional relation between the slit 3d and the light emitting element 2 remains constant. It follows that the light reaching the light-sensitive surface 1a of the PSD 1d is stable because it is free from the influence of diffusion particular to the light emitting element 2.

4th Embodiment

Figure 8:
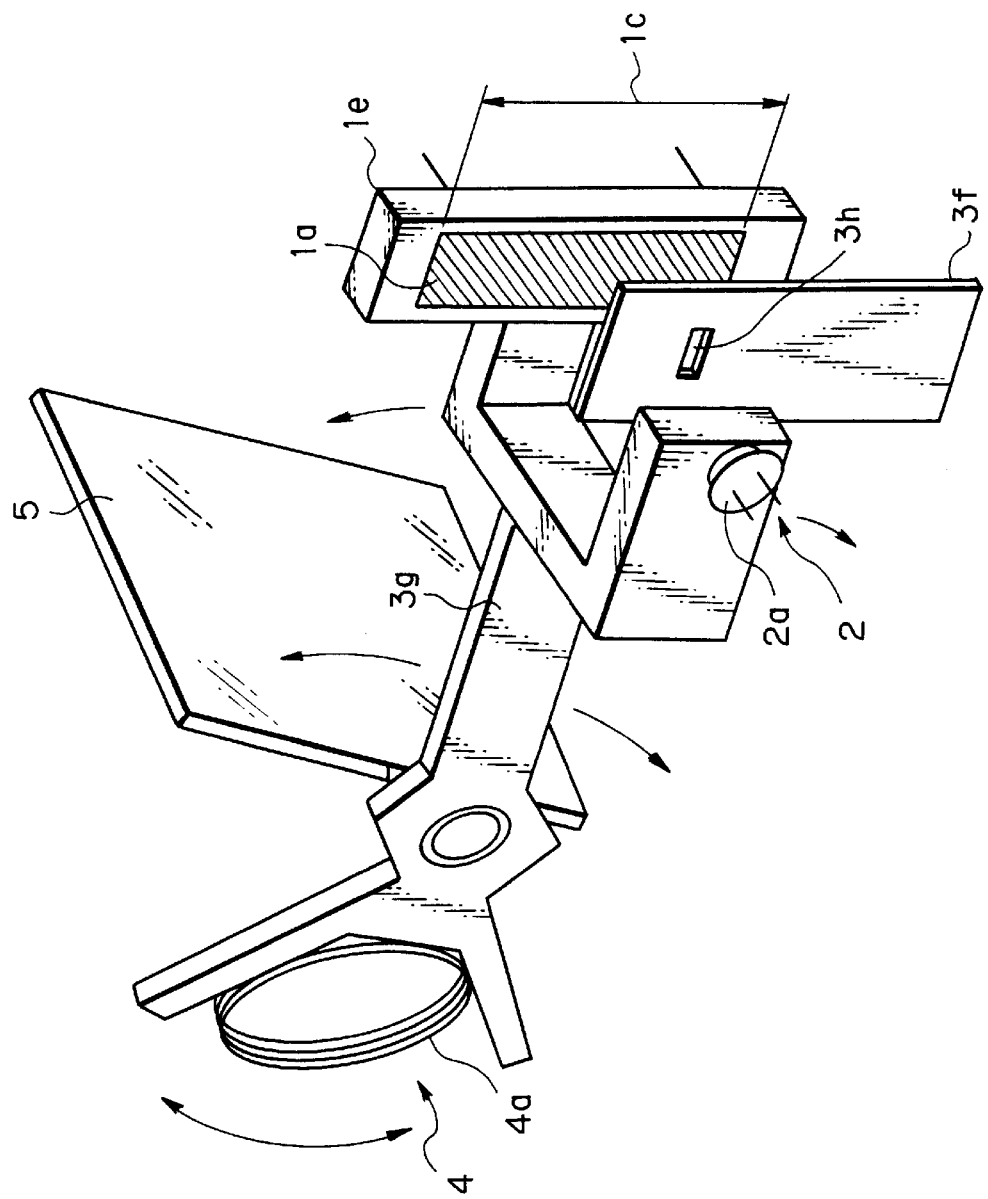
FIG. 8 is a perspective view showing a fourth embodiment of the present invention.
Figure 9:
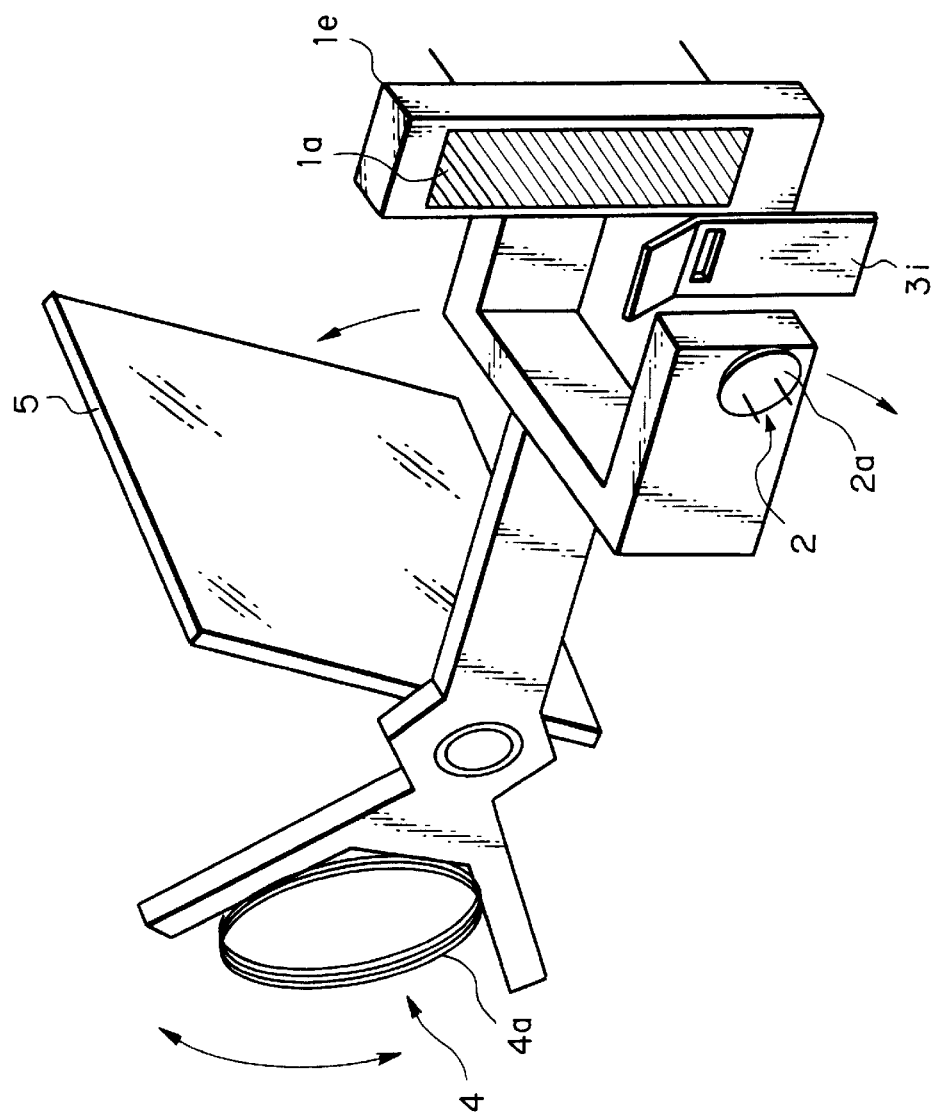
FIG. 9 is a perspective view showing a modification of a slit plate included in the fourth embodiment.

Referring to FIGS. 8 and 9, a fourth embodiment of the present invention includes an arm 3g extending from the center of rotation of the mirror 5. The free end of the arm 3g is bifurcated in the form of a letter U. The light emitting element 2 and a PSD 1e are respectively affixed to the bifurcated portions of the arm 3g, as illustrated. A flat slit plate 3f is fixed in place between the light emitting element 2 and the PSD 1e. In this condition, the PSD 1e and light emitting element 2 are rotatable relative to the slit plate 3f in interlocked relation to the rotation of the mirror 5. The PSD 1e is adhered or otherwise affixed to the inner surface of one of the bifurcated portions of the arm 3g while the light emitting element 2 is fixedly received in a hole formed in the other bifurcated portion.

The light emitting element 2 and slit plate 3f are spaced from each other by a preselected distance. The light emitting element 2 and PSD 1e are connected to a shaft about which the mirror 5 is rotatable. The slit plate 3f is affixed to a casing or similar stationary member, not shown, in the vicinity of the light-sensitive surface 1a of the PSD 1e. When an image is sequentially input, the mirror 5 is rotated, causing the light emitting element 2 and PSD 1e to rotate integrally therewith.

The light emitting element 2 and PSD 1e are rotated along with the mirror 5. At this instant, the light issuing from the light emitting element 2 is incident to the light-sensitive surface 1a of the PSD 1e over the effective light-sensitive area 1b. If desired, as shown in FIG. 9, the flat slit plate 3f may be replaced with a slit plate 3i so configured as to cover the light emitting element 2. This is also successful to reduce the length of the slit plate.

5th Embodiment

A fifth embodiment of the present invention will be described with reference also made to FIGS. 8 and 9. This embodiment is identical with the fourth embodiment except that the PSD 1e is fixed in place while the light emitting element 2 and slit plate 3f are movable in interlocked relation to the mirror 5. In this configuration, the light emitting element 2 and slit plate 3f are spaced from each other by a preselected distance and connected to the shaft about which the mirror 5 is rotatable. On the other hand, the PSD 1e is fixed in place with its light-sensitive surface 1a facing the slit plate 3f.

When an image is sequentially input, the mirror 5 is rotated, causing the slit plate 3f and light emitting element 2 to rotate integrally therewith. As a result, the light issuing from the light emitting element 2 is incident to the light-sensitive surface 11a of the PSD 1e over the effective light-sensitive length 1c via a slit 3h formed in the slit plate 3f. In this embodiment, the positional relation between the slit 3h and the light emitting element 2 is fixed. Again, as shown in FIG. 9, the flat slit plate 3f may be replaced with the slit plate 3i so configured as to cover the light emitting element 2 for the previously mentioned purpose.

In summary, it will be seen that the present invention provides an image scanner having various unprecedented advantages, as enumerated below.

(1) The image scanner effects subscanning while sensing the angular position of a mirror and thereby implements high-speed reading not available with a stepping motor. In addition, because the image scanner senses the angular position with a PSD, it is practicable with a small number of parts and a miniature configuration. Moreover, the image scanner needs only a single feedback control line and therefore a simple control circuit.

(2) A slit plate located in front of the PSD is bent toward a light emitting element. This successfully reduces not only the length of the slit plate but also the space necessary for the movement of the slit plate, thereby further reducing the size of the image scanner.

(3) The light emitting element and slit plate are fixed in place while the PSD is movable interlocked relation to subscanning so that light incident to the light-sensitive surface of the PSD is stable. This enhances accurate subscanning and therefore high image quality, and makes the movable range of the PSD smaller than the length of the light-sensitive surface of the PSD. This additionally reduces the size of the image scanner.

(4) The light emitting element and slit plate are movable in interlocked relation to subscanning, guaranteeing stable light incident to the PSD and therefore stable subscanning, i.e., high image quality. The slit plate is so configured as to cover the light emitting element and is therefore reduced in length, also implementing a miniature configuration.

Various modifications will become possible for those skilled in the art after receiving the teachings of the present disclosure without departing from the scope thereof.

What is claimed is:

1. An image scanner comprising:
   a linear image sensor for transforming a document image to an electric signal;
   a lens for focusing the document image on said linear image sensor;
   a subscanning mirror rotatable to vary a direction of reflection thereof for thereby sequentially inputing consecutive parts of the document image in a desired direction to said linear image sensor;
   an actuator for causing said subscanning mirror to rotate;
   angle sensing means for sensing a rotation angle of said subscanning mirror; and
   subscan drive control means for controlling rotation for subscanning in response to an output of said angle sensing means;
   said angle sensing means comprising:
      a slit plate formed with at least one slit for passing light therethrough, said slit plate being movable in interlocked relation to a rotation of said subscanning mirror; and
      a light emitting element and a position sensitive light detector (PSD) having a plurality of cathodes and facing said light emitting element with the intermediary of said slit plate.

2. An image scanner as claimed in claim 1, wherein said slit plate comprises a slit and a mask portion which is at least partly bent toward said light emitting element opposite in position to said PSD.

3. An image scanner as claimed in claim 1, wherein said angle sensing means comprises said light emitting element and said PSD facing each other with the intermediary of said slit plate, said PSD being movable in front of said slit plate in interlocked relation to a rotation of said subscanning mirror.

4. An image scanner as claimed in claim 1, wherein said angle sensing means comprises said light emitting element and said PSD facing each other with the intermediary of said slit plate, said light emitting element and said PSD being movable in interlocked relation to a rotation of said subscanning mirror.

5. An image scanner as claimed in claim 1, wherein said angle sensing means comprises said light emitting element and said PSD facing each other with the intermediary of said slit plate, said light emitting element and said slit plate being movable in interlocked relation to a rotation of said subscanning mirror.

6. In an image scanner comprising a monodimensional image sensor and a subscanning mechanism including a rotatable mirror for reading a document image bidimensionally, an angle sensor responsive to a rotation angle of said mirror for controlling subscanning comprises a slit plate formed with a slit, a light emitting element, and a position sensitive light detector (PSD) having a plurality of cathodes and facing said light emitting element with the intermediary of said slit plate, said slit plate for causing a restricted part of light to be incident to said PSD being so configured as to intercept light issuing from said light emitting element or to cover said light emitting element, said angle sensor sensing the rotation angle by causing a position on a light-sensitive surface of said PSD where the light from said light emitting element is incident via said slit to vary in accordance with a rotation of said mirror.

\* \* \* \* \*